March 19, 1968  G. R. QUILICI ET AL  3,373,702
MACHINE FOR MAKING RAVIOLI
Filed Oct. 14, 1965  4 Sheets-Sheet 1

INVENTORS.
GINO R. QUILICI
CHARLES V. QUILICI
BY Fred C. Matheny
ATTORNEY.

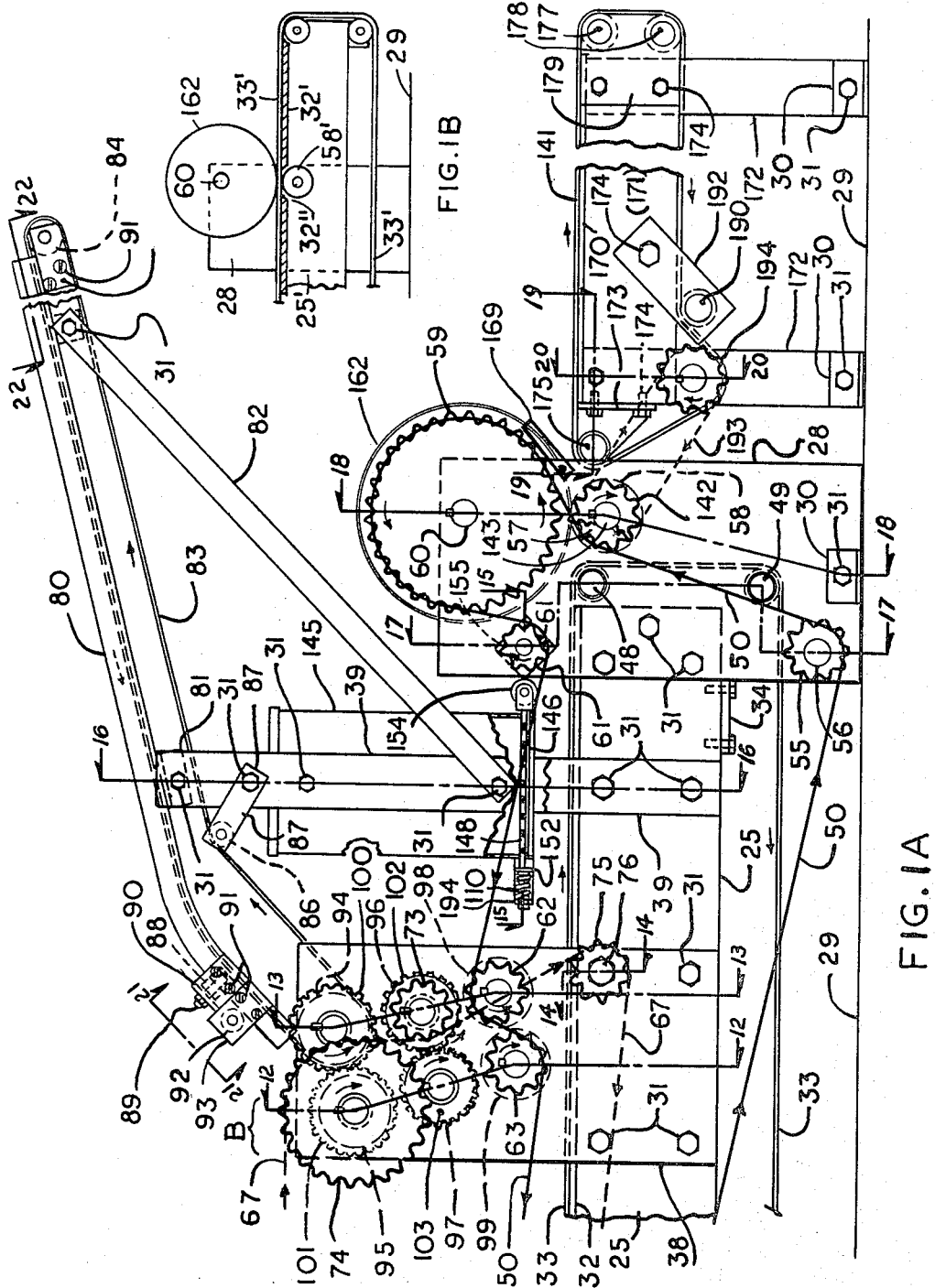

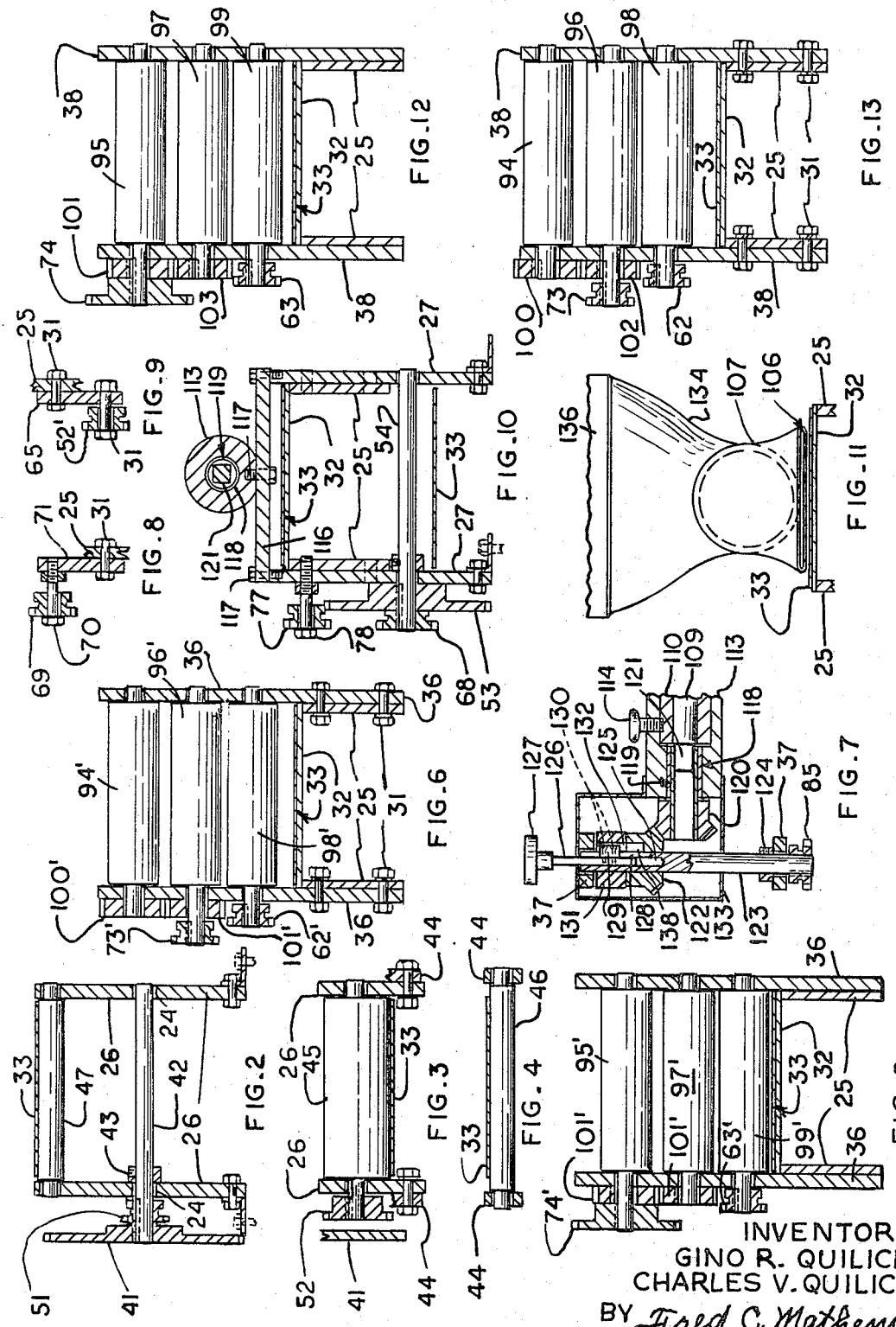

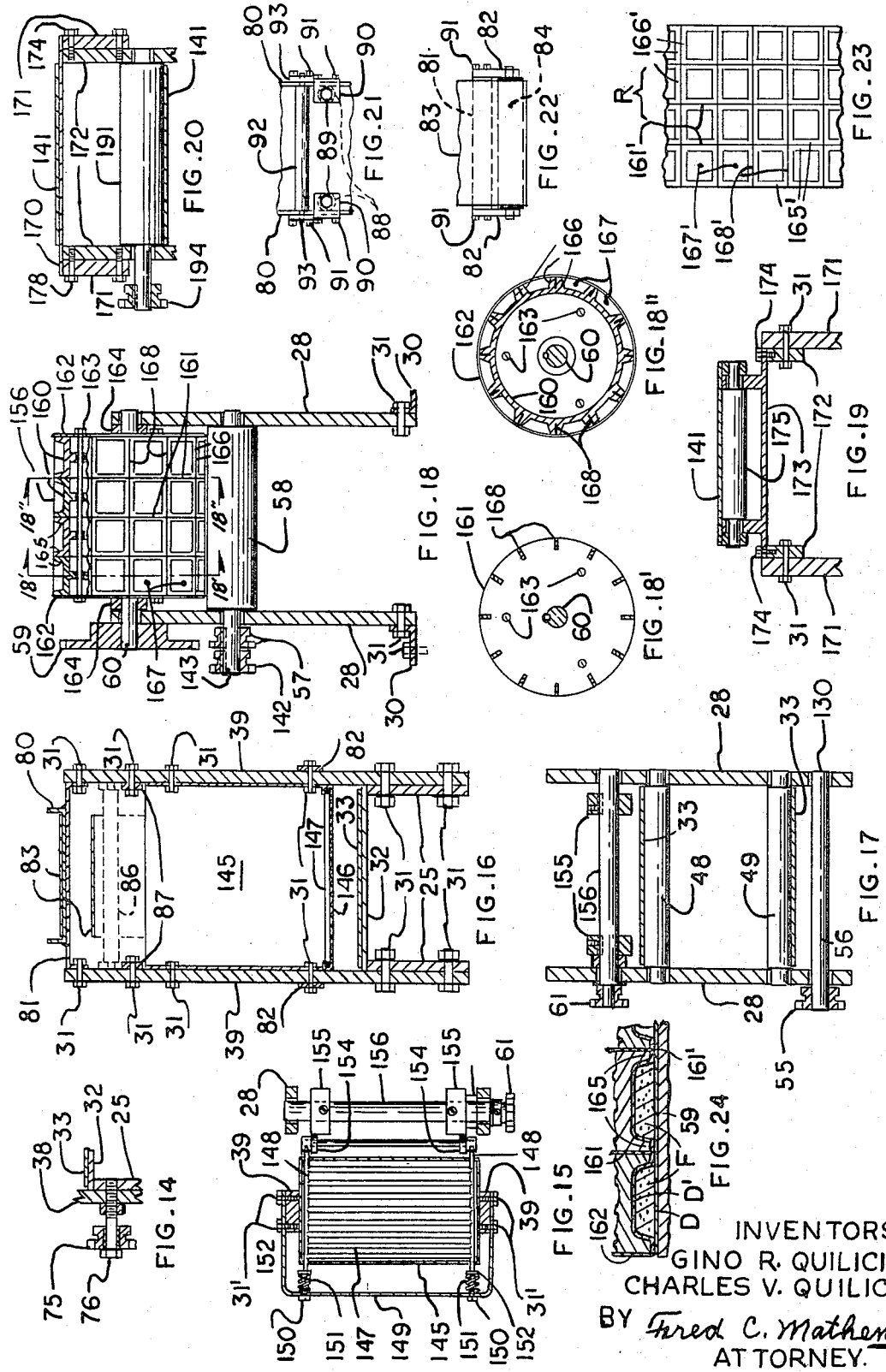

United States Patent Office 3,373,702
Patented Mar. 19, 1968

3,373,702
MACHINE FOR MAKING RAVIOLI
Gino R. Quilici, 1135 NE. 80th Ave., Portland, Oreg. 97213, and Charles V. Quilici, 4131 SE. Glenwood, Portland, Oreg. 97202
Filed Oct. 14, 1965, Ser. No. 495,818
12 Claims. (Cl. 107—1)

ABSTRACT OF THE DISCLOSURE

The machine comprises a long flat table, an endless, driven carrier belt having its upper lap supported and movable lengthwise along the table, pairs of rollers positioned to feed a lower sheet of dough onto the belt, filler supply means positioned to spread filler on the lower dough sheet, other pairs of dough feeding rollers positioned to lay an upper flat sheet of dough on the filler, means to sprinkle flour on the upper dough sheet, a die cylinder under which the dough sheets and filler pass and are pressed into squares and edge sealed, and a conveyor to carry away the product.

---

Our invention relates to a machine for making ravioli.

An object of our invention is to provide a machine which will produce ravioli of uniform size, shape and weight, each being formed of two outer layers of dough of uniform thickness with a predetermined uniform amount of filler between the two layers and each having a uniform seal around its marginal edges.

Another object is to provide a machine which will produce uniform ravioli in continuous strip or sheet form with sealed and crimped margins of proper width.

Another object is to provide a ravioli machine in which the cost of maintenance and upkeep is low and the cost of labor required for operating the machine is low and the rate of production of the machine is high.

Another object is to provide a machine for producing a continuously moving strip of ravioli in which a first or lower sheet of dough is laid down on an endless driven carrier belt, filler is then deposited on said lower sheet of dough, an upper sheet of dough of approximately the same width as the lower sheet is then laid down on top of the continuously moving filler and lower dough sheet, a sprinkling of flour is then deposited on the upper dough sheet and said upper dough sheet is then pressed and indented along longitudinal and transverse intersecting lines to cause uniform amounts of filler to be squeezed into pockets between the dough sheets and to cause the upper dough sheet to be squeezed into contact with the lower dough sheet along the edges of the two sheets and around the margins of the pockets of filler so that each pocket of filler is sealed off and the dough between the pockets of filler is indented or marked so that the strip is easily divided along intersecting lines to form individual ravioli squares.

Other objects of the invention will be apparent from the following description and accompanying drawings.

In the drawings—

FIG. 1A is a side elevation, with parts in cross section, of the other end portion of the machine.

FIG. 1B is a fragmentary sectional view, with parts in elevation, showing die means of modified form.

FIG. 2 is a view in cross section with parts in elevation, taken on broken line 2—2 of FIG. 1, showing a main drive shaft with attached sprocket wheels and an upper main belt supporting roller.

FIG. 3 is a fragmentary sectional view, with parts in elevation, taken substantially on broken line 3—3 of FIG. 1, showing a main belt driving roller.

FIG. 4 is a sectional view, taken substantially on broken line 4—4 of FIG. 1, showing a main belt tensioning roller in elevation.

FIG. 5 is a sectional view taken on broken line 5—5 of FIG. 1, showing in elevation a group of dough rolls and their driving means.

FIG. 6 is a sectional view taken on broken line 6—6 of FIG. 1, showing in elevation another group of dough rolls with their driving means.

FIG. 7 is a sectional view, with parts in plan, taken substantially on broken line 7—7 of FIG. 1, showing clutch and driving mechanism for filler feed means.

FIG. 8 is a fragmentary sectional view taken on broken line 8—8 of FIG. 1, showing a tightener sprocket for a secondary drive chain.

FIG. 9 is a fragmentary sectional view taken on broken line 9—9 of FIG. 1, showing a tightener sprocket for a main drive chain.

FIG. 10 is a sectional view taken on broken line 10—10 of FIG. 1, showing driving means for a secondary drive chain and driving means for a filler feed screw.

FIG. 11 is a view in elevation, with parts in section, taken on broken line 11—11 of FIG. 1, showing a filler receptacle and filler screw housing with slotted filler discharge nozzle.

FIG. 12 is a sectional view taken on broken line 12—12 of FIG. 1A, and showing in elevation, a group of dough rolls similar to those shown in FIG. 5.

FIG. 13 is a sectional view taken on broken line 13—13 of FIG. 1A, showing in elevation another group of dough rolls similar to those shown in FIG. 6.

FIG. 14 is a sectional view taken on broken line 14—14 of FIG. 1A, showing a direction control idler sprocket for a secondary drive chain.

FIG. 15 is a view partly in section and partly in plan taken on broken line 15—15 of FIG. 1A, showing flour sifting means.

FIG. 16 is a sectional view, with parts in elevation, taken on broken line 16—16 of FIG. 1A and showing a dough feed trough and flour sifter in relation to a main carrier belt.

FIG. 17 is a sectional view, with parts in elevation, taken on broken line 17—17 of FIG. 1A, and showing a flour sifter cam shaft and part of the driving means therefor.

FIG. 18 is a sectional view, with parts in elevation, taken on broken line 18—18 of FIG. 1A, and showing a die cylinder assembly and its driving sprocket and a die roll associated therewith.

Figure 1:
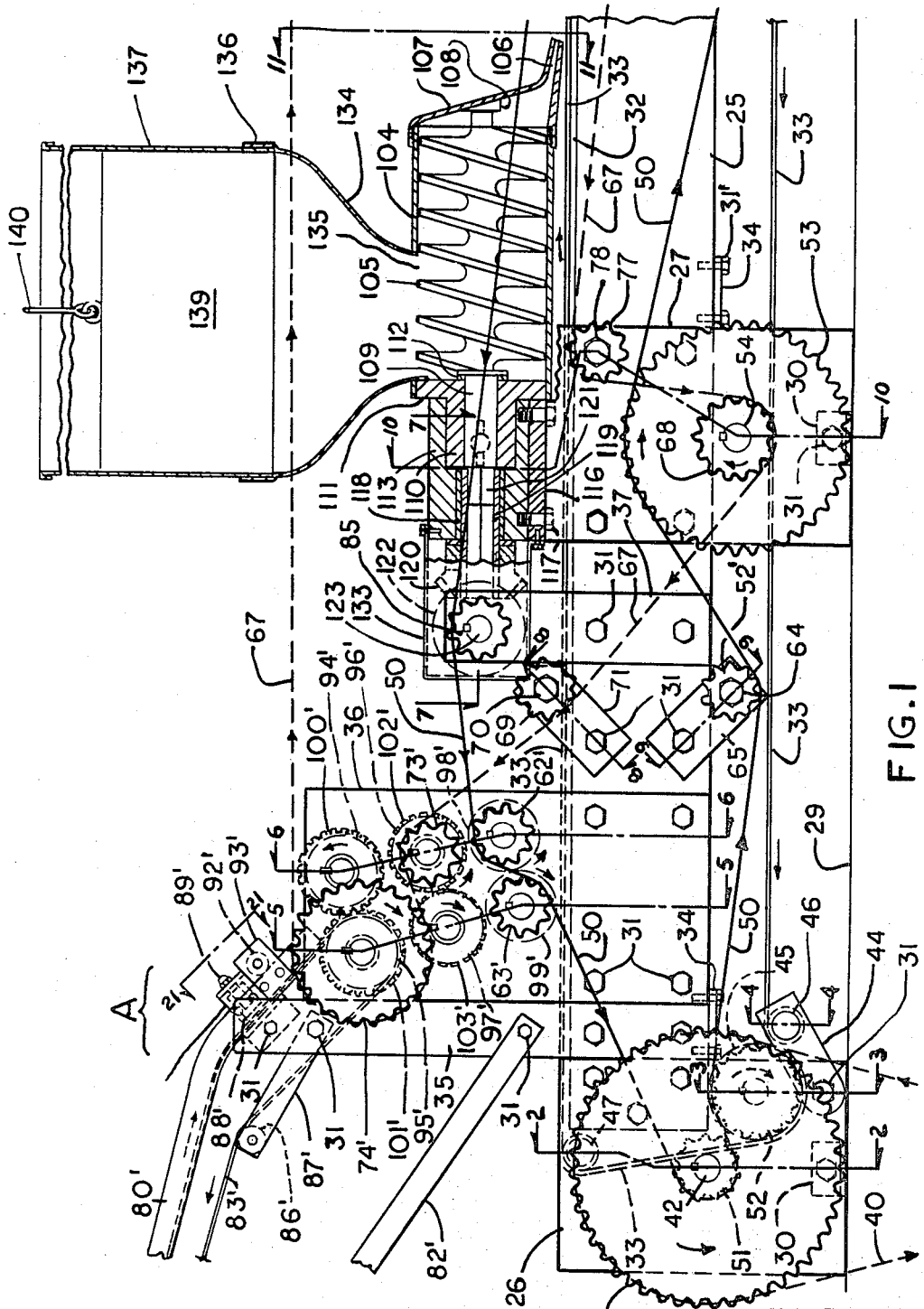
FIGURE 1 is a side elevation of one end portion of our machine with parts thereof shown in cross section.

FIG. 18' is a sectional view, with parts in elevation, taken on broken line 18'—18' of FIG. 18.

FIG. 18" is a sectional view, with parts in elevation, taken on broken line 18"—18" of FIG. 18.

FIG. 19 is a fragmentary sectional view, with parts in plan, taken on broken line 19—19 of FIG. 1A and showing off-bearing belt means.

FIG. 20 is a fragmentary sectional view, with parts in elevation taken on broken line 20—20 of FIG. 1A and showing off-bearing belt driving means.

FIG. 21 is a fragmentary plan view taken on broken line 21—21 of FIG. 1A, showing means for controlling the width and thickness of a dough strip in a dough trough.

FIG. 22 is a fragmentary plan view taken on broken line 22—22 of FIG. 1A, showing mounting means for a belt in a dough trough.

FIG. 23 is a fragmentary plan view showing the ravioli as they appear when they emerge in a continuous strip from the machine.

FIG. 24 is a fragmentary sectional view, on a larger scale than the other figures, illustrating the operation of a cylindrical die assembly and die roll in shaping a strip of ravioli.

Like reference numerals refer to like parts throughout the several views.

In a general way our machine comprises a frame; an endless driven carrier belt supported by the frame; a first dough feeding unit positioned to lay down a lower flat sheet or strip of dough on an intake end portion of said carrier belt; filler feed means positioned to lay down a layer of filler on said lower sheet of dough; a second dough feeding unit positioned to lay down an upper flat sheet or strip of dough on said filler and lower dough sheet; a sifter positioned to deposit a sifting of flour on said upper dough sheet; a die assembly positioned to receive the two moving sheets of dough with filler between them and adapted to press the upper dough sheet into sealing contact with the lower dough sheet along the edges of the two dough sheets and along intersecting longitudinal and transverse lines and in so doing to squeeze the filler into pockets which are marginally sealed and leave the dough sheets weakened in the marginal sealed areas so the finished strip can easily be divided along lines at right angles to each other into ravioli squares; and to further provide off-bearing belt means to receive and carry away the ravioli strip as it emerges from the die assembly.

The frame of our machine comprises two similar, spaced apart, parallel, longitudinally extending main frame members 25 which are supported by three sets or pairs of upright, spaced apart frame plates 26, 27 and 28. The lower ends of the frame plates 26, 27 and 28 rest on a support, such as a table indicated by line 29, and preferably are attached to said support 29 by angle brackets 30 which are secured by bolts 31 to said upright frame plates and to said support 29. A smooth, flat, horizontal table or belt supporting plate 32 rests on and is secured to the upper edges of the main frame members 25. The table 32 holds the frame members 25 in spaced apart relation and forms a support for a main, endless, traveling carrier belt 33 hereinafter described. Cross plates 34 are secured by cap screws 31' to the lower edges of the main frame members 25 and cooperate in holding said frame members 25 in properly spaced apart relation. Spaced apart pairs of upright frame members 35, 36, 37, 38 and 39 are rigidly secured to the frame members 25 by bolts 31 and extend upwardly from said frame members 25 to support mechanism hereinafter described.

A variable speed source of power is connected by a sprocket chain 40, FIG. 1, with a sprocket wheel 41 on a shaft 42 which is mounted in suitable bearings 24, FIG. 2, supported by the upright frame members 26. A collar 43 on the shaft 42 limits endwise movement of said shaft in one direction. The bearings 24 of the roller 45 and all other similar bearings in the machine are of the self lubricating type.

The endless main carrier belt 33 passes under and around and is driven by a roller 45, FIG. 3. Said main carrier belt 33 also passes over a tightener roller 46, FIGS. 1 and 4, and a guide roller 47, both near the end of the machine shown at the left, and over two other guide rollers 48 and 49 near the end of the machine shown at the right in FIG. 1A. The top lap of said main carrier belt 33 moves slidably on the smooth flat table 32. This table 32 forms a continuous support for the upper lap of the main carrier belt 33 between the two rollers 47 and 48. The tightener roller 46 is rotatively supported by arms 44 which are adjustably secured to the frame members 26 by bolts 31.

*Main drive chain*

The carrier belt driving roller 45 is driven by an endless main drive chain 50, shown diagrammatically in FIGS. 1 and 1A by a line having arrow points thereon to indicate the direction of travel of said chain. Said chain 50 is driven by a sprocket wheel 51 on the driven shaft 42 and said chain 50 passes over and drives a sprocket wheel 52 on the shaft of the belt driving roller 45. The main drive chain 50 directly drives parts of two dough supply assemblies A and B of duplicate construction, which are respectively positioned near the intake end of the machine, shown at the left in FIG. 1 and near the discharge end, shown at the right in FIG. 1A. In the drawings the parts of the dough supply assembly A, indicated by primed numerals are duplicates of the parts which, in assembly B, are indicated by the same numerals not accompanied by the prime sign. A later description herein of the assembly B will apply equally well to assembly A.

Starting from the sprocket wheel 51 by which the main drive chain 50 is driven and following said main drive chain 50 in the direction of its travel, said chain 50 passes over the sprocket wheel 52 on the shaft of the carrier belt driving roller 45, thence under a small tightener and guide sprocket 52' thence over a relatively large sprocket wheel 53 on a shaft 54, thence under a guide sprocket 55, FIG. 1A, on a shaft 56, thence upwardly over a sprocket 57, see also FIG. 18, which is directly back of another sprocket 142 hereinafter described, the sprocket 142 being on the shaft 143 of a die roller 58 and being partially broken away in FIG. 1A. The main drive chain 50 then passes around a relatively large sprocket wheel 59 on the shaft 60 of a die cylinder assembly hereinafter described, thence under a guide sprocket 61, thence to the left successively over and under two paired roller driving sprockets 62 and 63 of dough supply assembly B, thence over a sprocket wheel 85, FIG. 1, of filler feed driving means hereinafter explained, thence successively over and under two paired roller driving sprockets 62' and 63' of the dough supply assembly A, and thence to the sprocket wheel 51 by which said main drive chain is driven. The tightener and guide sprocket 52' is rotatively supported on a bearing member 64 which is rigid with an arm 65 that is adjustably secured to the main frame member 41 by a bolt 31.

*Secondary drive chain*

A secondary drive chain 67, shown diagrammatically in FIGS. 1 and 1A by broken lines, passes around and is driven by a sprocket wheel 68 on the shaft 54. Starting from the sprocket wheel 68 and following this secondary drive chain 67 in the direction of its travel, as indicated by arrow points, said chain 67 passes under an idler and tightener sprocket 69 on a bearing member 70 which is rigid with a tightener arm 71. Arm 71 is adjustably secured by a bolt 31 to a main frame member 25. From tightener sprocket 69 said secondary chain 67 passes over a smaller sprocket 73' and under and around a larger sprocket 74' of the dough assembly A, thence to the right, see FIG. 1A, over and around a larger sprocket 74 and downwardly and partially around a smaller sprocket 73 of the dough assembly B, thence around an idler sprocket 75 on a bearing pin 76 and over another idler sprocket 77, FIG. 1, on a bearing pin 78 to its driving sprocket 68.

*Dough supply assembly B*

The dough supply assembly B, shown in FIGS. 1A, 12, 13, 14, 16, 21 and 22, comprises a dough trough 80 having the end portion thereof shown at the left in FIG. 1A supported from the upright frame members 39 by a cross bar 81, FIG. 16, attached to said frame members by bolts 31 and having an end portion thereof shown at the right supported by diagonal bars 82. The ends of bars 82 are connected with the upright frame members 39 and with the trough 80 by bolts 31. An endless dough feed belt 83 is supported on rollers 84 and 94 in such a manner that its uppermost lap is disposed within and movable longitudinally along the trough 80 in the direction indicated by arrows. The lowermost lap of said belt 83 passes over at least one belt tightening roller 86 carried by arms 87 which are adjustably secured to the frame members 39 by bolts 31. The end of the trough 80 shown at the left in FIG. 1A and shown in FIG. 21, is provided with two transversely spaced apart upright sizing rollers 88 between which the belt 83 passes. The sizing rollers 88 are mounted on bearing members 89 carried by brackets 90. The brackets 90 are secured by screws 91 to the trough 80. Also a horizontal roller 92 is mounted in brackets 93 and extends across the trough 80 in spaced relation above the belt 83 and near the upright guide rolls 88. Dough fed onto the end portion of the belt 83 shown at the right in FIG. 1A will be carried by said belt 83 under the roll 92 and between the upright rolls 88 and will be initially sized as to width and thickness just before it is delivered to and passes downwardly between three sets of dough sizing and dough feeding rollers 94, 95, 96, 97 and 98, 99. The two rollers 98 and 99 of the lowermost set are driven in opposite directions by the main drive chain 50 which engages with sprockets 62 and 63 on the shafts of said rollers. The roller 95 of the uppermost set is driven by the secondary drive chain 67 which engages with the large sprocket wheel 74 on the shaft of said roller 95. A gearwheel 101 on the shaft of said roller 95 meshes with another gearwheel 100 of the same size on the shaft of the roller 94 and provides for driving said roller 94 at the same speed and in the opposite direction from the roller 95. The shafts of the medial pair of rollers 96 and 97 are respectively provided with enmeshed gearwheels 102 and 103 of equal size and the shaft of said roller 96 is driven by the secondary drive chain 62 which engages with the sprocket wheel 73 on said shaft. The three sets of rollers 94, 95 and 96, 97 and 98, 99 are disposed between and supported for rotation by the two spaced apart upright frame members 38. The rollers 98, 99 of the lowermost pair are positioned close to and above the main carrier belt 44. All of the rollers 94 to 99 inclusive can be the same size but said rollers are mounted so that less space is provided between each successive pair of rollers, downwardly considered. Thus a sheet of dough feeding downwardly between these rollers is successively squeezed thinner by each set of rollers between which it passes. The driving means for these rollers is designed so that, downwardly considered, the rollers of the three sets are driven at progressively increasing peripheral speed. This provides for progressively increasing the lineal speed of a moving strip or sheet of dough as its thickness is progressively reduced. Also these rollers have their axes positioned in planes which are close to the vertical but which, downwardly considered are inclined toward the discharge end of the machine. An incline in the order of fifteen degrees from the vertical has been found to be satisfactory but this incline may be varied. This incline, being in the direction of movement of the top lap of the carrier belt 44, provides for laying a strip or sheet of dough down smoothly and evenly on any layer of material carried on the carrier belt 44 as said dough emerges from between the lowermost set of rolls 98, 99.

We find it satisfactory, in a ravioli machine, to position the two lowermost rollers 98, 99 about .040 of an inch apart. Due to the fact that dough made from most kinds of flour will expand somewhat when it is released by these rollers 98, 99 this spacing results in the delivery onto the belt 44 of a sheet of dough of from .050 to .053 of an inch in thickness.

*Dough supply assembly A*

In the dough supply assembly shown at the left in FIG. 1 and shown more in detail in FIGS. 5 and 6 the parts indicated by primed numbers are duplicates of the corresponding parts indicated by non-primed numbers in just described dough feeding assembly B and they function in the same manner. Said dough feeding assembly A is supported by and between the two pairs of upright frame members 35 and 36 and is positioned to deliver a strip or sheet of dough in the same manner and at the same incline as the dough feeding assembly B and its lowermost feed rolls 98', 99' are adapted to deliver the dough directly onto the intake end portion of the main carrier belt 44 near the location where said belt 44 passes onto the belt supporting table 32. Because the feed trough 80' approaches assembly A from a direction opposite to the direction of approach of the feed trough 80 of assembly B the feed belt 83' of assembly A passes around the roller 95' instead of around the roller 94'. The dough supply assembly A lays down, on the main carrier belt 33, a flat strip or sheet of dough of a width slightly less than the width of said belt 33. Suitable devices which will now be described are provided between the two dough supply assemblies A and B for laying down a layer of filler on the dough sheet laid down by assembly A.

*Filler supply means*

The filler supply means, FIGS. 1, 7, 10 and 11, comprises a longitudinally extending, horizontal, tubular housing 104 having therein a filler feed screw 105 adapted when driven to discharge a thin flat layer of filler from an elongated slot 106 in a cap or nozzle part 107 which forms one end wall of the tubular housing 104. Preferably the nozzle part 107 is threaded onto or otherwise removably secured to the tubular housing 104 so it can easily be removed for cleaning. A bearing 108 for the forward end of the feed screw 105 is provided in the nozzle part 107. The rear end of the feed screw 105 has an axial bearing shank 109 which is rotatively disposed within a tubular housing 110 on the rear end wall 111 of the cylindrical housing 104. A thrust washer 112 is provided between feed screw 105 and the housing end wall 111. The hub 110 fits within and is supported by a fixed tubular housing member 113. A thumb screw 114, FIG. 7, controls withdrawal of hub 110 from the fixed housing member 113. The housing member 113 is flattended on its lower side, FIG. 10, and rests on and is secured by screws 117 to a frame plate 116. The frame plate 116 is supported by the upright frame members 27 to which it is secured by screws 117. The end portion of the housing member 113 shown at the left in FIG. 1 is of reduced internal diameter and has a bearing tube or bushing disposed therein. A tubular hub member 119, which is rigid with a bevel gear 120 is rotatively received within the bearing tube 118. The tubular hub member 119 is externally cylindrical and has a square internal passageway. The bearing shank 109 of feed screw 105 terminates in a part 121 of square cross section, see FIG. 10, which fits within the square passageway in hub member 119 of bevel gear 120. The bevel gear 120 meshes with another bevel gear 122 on a cross shaft 123, FIG. 7, which carries the sprocket wheel 85. The shaft 123 is journaled in the two upright frame members 37. A collar 124 on shaft 123 adjacent one frame member 37 prevents endwise movement in one direction of said shaft 123.

Devices are provided for selectively locking the bevel gear 122 to the shaft 123 so it can be driven by said shaft or released from said shaft to neutralize the feed screw driving means. This is accomplished by providing in one end portion of the shaft 123 an axial bore 125 to receive a control rod 126 which has a knob 127 on its outer end. Shaft 123 has a longitudinal slot 128 intersecting bore 125 and receiving a flat key member 129. Key member 129 is secured by screws 130 to control rod 126 and can be moved lengthwise therewith. A collar 131 is mounted on the shaft 123 between the bevel gear 122 and the adjacent frame part 37. The collar 131 has a longitudinally extending internal keyway 1332 which slidably receives the outer edge portion of the key 129 so that the collar 131 will always be rotated with the shaft 123. The gear 122 has a longitudinally extending keyway 138 therein. The key 129 can be moved into this keyway 138 in bevel gear 122 by pressing the control rod 126 inwardly. This will cause the bevel gear 122 to be driven with the shaft 123 and to drive the feed screw 105. If said key 129 is withdrawn from keyway 132 by moving the control rod 126 outwardly into a position as shown in FIG. 7 this will uncouple the bevel gear from the shaft 123 and neutralize the drive to the feed screw 105. Preferably a housing 133 is provided for bevel gears 120 and 122.

Filling of semi-solid consistency from a hopper shaped receptacle 134 is supplied to the cylindrical feed screw housing 104 through an opening 135 in the top wall of said housing near its rear wall 111. Preferably the receptacle 134 is of shallow depth and the upper end portion thereof has a flange 136 of slightly enlarged diameter to telescopically receive the bottom end portion of a removable tubular upper section 137. This upper section can be of any desired height. Since the filler material used and contained in the tubular section 137 is liable to be of fairly thick consistency it is is usually necessary to place this filler under pressure to insure a proper flow of filler to the feed screw 105. One way to place this filler under pressure is to provide a cylindrical weight 139 which can be lowered into the receptacle 137 and allowed to rest on the filler. This weight 139 can have a cable 140 attached thereto and connected with any suitable hoisting and lowering means to hoist and lower the weight. Obviously pressure on the filler can be provided in various other ways.

*Flour sifter*

A flour hopper 145, FIGS. 1A, 15 and 16, is supported between upright frame members 39 by bolts 31. Hopper 145 is of rectangular cross section, is open at the upper end and has a screen mesh bottom 146. A plurality of transverse parallel movable bars 147 are provided within the hopper 145 and are attached to longitudinally disposed side bars 148 which extend through the front and rear walls of the hopper 145. Preferably the scraper bars 147 have flat lower edges which rest on and are movable over the screen 146 and, by their scraping action, keep the screen 146 clean and insure an even sifting of flour through it. The ends of the side bars 148, shown at the left in FIGS. 1A and 15 are provided with or abut against collars 152. A U-shaped yoke 149 is secured by screws 31' to frame members 39 and extends across hopper 145 in spaced relation therefrom. Screws 150 extend through yoke 149 and have compression springs 151 thereon and have threaded connection with the side bars 148. The springs 150, being interposed between the yoke and collars 152 urge the side bars 148 to the right. The ends of the side bars shown at the right have rollers 154 connected therewith. The rollers 154 are positioned to be contacted by suitable parts of cams 155 which cooperate with the springs 151 to impart reciprocating movement to the side bars 148 and scraper bars 147. The cams 155 are secured to a cross shaft 156 which has the sprocket wheel 61 secured thereto. Sprocket wheel 61 is driven by main drive chain 50. Thus the bars 147 will be moved reciprocably over the screen 146 and provide an even sprinkling of flour over the top dough sheet whenever the machine is operating. This sprinkling of flour contributes to the smooth operation of die means used to shape the ravioli, as hereinafter described.

*Die cylinder assembly*

A die cylinder assembly, FIGS. 1A, 18, 18' and 18", is provided near the discharge end of the machine. This assembly is positioned between the end of the main carrier belt 33 and the end of an off-bearing belt 141 and above the die roll 58 so that the ravioli which have been assembled or laid down on the main carrier belt 33 will pass between this die cylinder assembly and the die roll 58 and will be scored and marked off into squares and will have its edges trimmed as it passes between said die cylinder assembly and said die roll 58.

The die cylinder assembly and die roll 58 are positioned between and carried by the upright frame parts 28 and the shaft 143 of the die roll 58 has the sprocket wheel 57 fixedly secured thereto so that shaft 143 and die roll 58 are driven by the main drive chain 50. The die cylinder assembly comprises a plurality of side by side cylindrical members 160, a plurality of crimper discs 161 and two edge trimmer discs 162 all assembled in side by side relation to form a drum and all secured together by long bolts 163. The die cylinder assembly thus formed is disposed between the main frame members 28 and spaced from said frame members 28 by spacer members 164. Said die cylinder assembly is fixedly mounted on the previously described shaft 60 which carries the sprocket wheel 59 and is driven by the main drive chain 50. Four of the cylindrical members 160 with three crimper discs interposed between them are herein disclosed but it will be understood that this number may be varied.

Each cylindrical member 160 is provided with narrow annular, outwardly protruding edge-sealing peripheral ribs 165, FIGS. 18 and 24. These ribs 165 are intersected by outwardly protruding edge-sealing cross ribs 166, FIG. 18", and the intersecting ribs form, in the periphery of the die cylinder assembly, a plurality of recesses or pockets 167 of square outline and of uniform size and positioning. The over-all diameter of the crimper discs 161 is slightly greater than the over-all diameter of the annular ribs 165 so that the crimper discs 161 protrude a short distance outwardly from the ribs 165. The transverse ribs 166 and the peripheral portions of the crimper discs 161 are suitably grooved to receive crimper blades 168. The blades 168 are rigid with the ribs 166 and extend across the crimper discs 161 and their outer edges are flush with the outer edges of the discs 161. Preferably the outer edges of both the crimper discs and the crimper blades are flat and unsharpened and free from transverse curvature although, transversely considered, they may have a wave like appearance. The peripheral speed of the die cylinder assembly and the die roller 58 are the same and this peripheral speed is substantially the same as the lineal speed of the main carrier belt 33. The edge trimmer discs 162 are of slightly larger over-all diameter than the crimper discs 161 and are sharpened to a chisel edge by beveling them on their outer sides so they will cleanly trim the edges of the two dough strips. The dough trimmed from these edges can be salvaged and re-used if desired. Suitable scraper or deflector means 169, FIG. 1A, is supported in such a manner that it contacts and scrapes against the lower peripheral portion of the die cylinder assembly at a location a short distance above the horizontal plane of the emerging product. This scraper will tend to downwardly deflect any dough which tends to cling to the die cylinder assembly as it moves free of the advancing product.

As the product passes between the die cylinder assembly and the die roll 58 the bottom layer D of dough will remain approximately flat and the top layer D' of dough will be pressed into a shape as illustrated in FIGS. 23 and 24 by ribs 165 and 166, discs 161 and blades 168. The ribs 165 and 166 will press the top dough layer D' down on the bottom dough layer D so as to leave in the top of the ravioli strip R, longitudinal and transverse intersecting trough like flat bottomed depressions 166' of substantial width. The filler F, when placed under pressure will cause the top layer D' of dough to expand into the square pockets 167 of the die cylinder and form mounds 167' of square outline, each filled with filler F. The crimper discs will imbed themselves a little deeper into the top dough layer D' then the ribs 165 do and will form narrow, shallow longitudinal grooves or lines of fracture 161' in the finished product. Likewise the transverse blades 168 will imbed themselves in the dough a little deeper than the cross ribs 166 and form transverse grooves or marks 168' defining weakened lines of cross fracture. Thus the die cylinder assembly will squeeze the filler F into pockets and at the same time mark the product longitudinally and transversely so it can easily be divided into squares.

FIG. 1B shows die means of modified form in which a free running, non-driven roller 58' is used in opposed relation to the die cylinder assembly in place of the driven roller 58 and in such a manner that the carrier belt 33' is between the roller 58' and the die cylinder assembly. The frame member 25', belt supporting table or plate 32' and carrier belt 33' of FIG. 1B are similar respectively to the previously described parts 25, 32 and 33 except that they are made longer and the table 32' has a transverse clearance opening 32" in which the upper peripheral portion of roller 58' operates, said upper peripheral portion of roller 58' being substantially flush with the upper surface of table 32'. The die cylinder assembly of FIG. 1B is the same as the previously described die cylinder assembly and the parts thereof which are shown are similarly numbered. The belt 33' is a smooth, endless belt, preferably of "Neoprene." It is wide enough so it extends beyond the two edge trimmer discs 162 which are carried by the die cylinder assembly. The roller 58', being free running moves with the carrier belt 33' and supports said carrier belt at the location where the dough is pressed down on said belt by parts of the die cylinder assembly. The edge trimmer discs 162 contact the belt 33' lightly so as to trim the edges of the dough but not injure the belt. The opening 32" in table 32' is wide enough so that the belt 33' will not be pressed against said table 32' by the trimmer discs 162. The construction shown in FIG. 1B is simpler and less expensive and more easily cleaned than the construction shown in the other figures and it operates in a similar manner.

Off-bearing devices

Devices shown in FIGS. 1A, 19 and 20 are provided to receive the finished product and deliver it at any desired location, These devices comprise a horizontal table 170 having sides 171 and supported by legs 172. Frame bracket means 173 is secured by cap screws 174 to the legs 172 at the end of the table nearest the die cylinder assembly. A roller 175 is journaled in the bracket 173. The off-bearing belt 141 passes around the roller 175 and along the table 170 and around two vertically spaced apart rollers 177 and 178 which are supported by a frame bracket 179 at the discharge end of the table 170 and back over a tightener roller 190 and under a driving roller 191 to the roller 175. The belt tightening roller 190 is supported by arms 192, only one of which is shown. Bolts 194 secure the arms 190 to the side members 171. The driving roller 191 is driven by a sprocket chain 193 which passes around a sprocket wheel 194 on a shaft of said roller 191 and around the sprocket wheel 142 on the driven shaft 143 of the die roller 58. The off-bearing belt 141 is driven at approximately the same speed as the main carrier belt 33.

In the operation of our machine a lower sheet of dough of a chosen uniform thickness will be laid down by the rolls of the first dough assembly A on the endless traveling carrier belt 33; a layer of filler of less width than the lower dough sheet is then laid down by the filler supply means on said lower dough sheet; an upper dough sheet of chosen uniform thickness and of the same width as the lower dough sheet is then laid down by the rolls of the second dough assemby B on the filler carried by the lower dough sheet; a sprinkling of flour is then deposited on the upper dough sheet by the flour sifter; the two dough sheets with the filler between them are then marked out and formed into squares as they pass the die roll and die cylinder and the product is delivered to the off-bearing belt in a continuous strip which can easily be divided into individual ravioli squares.

Obviously changes in our machine can be made within the scope of the following claims.

We claim:

1. In a machine of the class described, a table; an endless driven carrier belt having a top lap supported on and movable along said table; a first dough feeding assembly comprising a dough trough, an endless driven dough feeding belt operating in said dough trough, and a plurality of vertically spaced apart pairs of dough feeding rolls, the uppermost pair of said rolls being positioned to receive dough from said belt and the lowermost pair of said rolls being positioned to spread a lower flat sheet of dough on said carrier belt adjacent the location where said carrier belt is moving onto said table; filler supply means positioned to spread a layer of filler on said lower flat sheet of dough; and a second dough feeding assembly comprising a dough trough, an endless driven dough feeding belt operating in said dough trough, and a plurality of vertically spaced apart pairs of dough feeding rolls, the uppermost pair of said rolls being positioned to receive dough from said belt and the lowermost pair of said rolls being positioned to spread an upper flat sheet of dough over the layer of filler on said lower dough sheet.

2. A ravioli machine comprising a table; an endless driven carrier belt having a top lap supported on and movable along said table; a first dough feeding assembly comprising a dough trough, an endless driven dough feeding belt operating in said dough trough, and a plurality of vertically spaced apart pairs of dough feeding rolls, the uppermost pair of said rolls being positioned to receive dough from said belt and the lowermost pair of said rolls being positioned to spread a lower flat sheet of dough of substantially uniform width on said carrier belt adjacent the location where said carrier belt is moving onto said table; filler supply means positioned to deliver a layer of filler of less width than said lower flat sheet of dough onto said sheet; a second dough feeding assembly comprising a dough trough, an endless driven dough feeding belt operating in said dough trough, and a plurality of vertically spaced apart pairs of dough feeding rolls, the uppermost pair of said rolls being positioned to receive dough from said belt and the lowermost pair of said rolls being positioned to spread an upper flat sheet of dough of uniform width equal to the width of said lower dough sheet and greater than the width of said layer of filler over said layer of filler, said dough sheets registering with each other and having marginal portions unobstructed and free for direct contact with each other; a roller positioned beyond said second dough feeding assembly below and in supporting relation to the two overlying dough sheets; a die cylinder positioned above said roller and above and in contacting relation to the upper dough sheet; and two spaced apart edge-sealing ribs carried by said die cylinder adapted to roll on the marginal edge portions of the two overlying dough sheets and cooperating with said roller in sealing together said marginal edge portions.

3. The apparatus as claimed in claim 2 in which a flour sifter capable of depositing a sprinkling of flour on said upper dough sheet is positioned between said second dough feeding assembly and said die cylinder.

4. The apparatus as claimed in claim 2 in which, in each dough feeding assembly, the two transversely spaced apart rolls of each successive pair, downwardly considered, are closer together than the two rolls of the pair immediately above them, whereby the thickness of a sheet of dough being fed downwardly between the rolls of the successive pairs will be reduced by each successive pair of rolls it passes between.

5. The apparatus as claimed in claim 2 in which two peripherally sharpened edge-trimmer discs of slightly larger diameter than said edge-sealing ribs are carried by said die cylinder adjacent to and outwardly from said edge-sealing ribs, whereby the overlying dough sheets are edge trimmed by said discs.

6. The apparatus as claimed in claim 5 in which the peripheral wall of the die cylinder between the edge-sealing ribs is provided with spaced apart annular and transverse ribs which are the same height as said edge-sealing ribs and extend crosswise of each other and intersect each other and form, in said peripheral wall, pockets of approximately square outline, whereby when two sheets of dough with filler between them are passed between said die cylinder and said die roll the parts of the dough sheets which register with the ribs will be pressed into sealing contact with each other and filler will be trapped between portions of the dough sheets which register with said pockets.

7. The apparatus as claimed in claim 6 in which both the annular and transverse ribs have narrow dough-marking members of shallow depth rigid therewith and protruding short distances outwardly from their outer faces, said dough-marking members being adapted to form dough-weakening indentations along predetermined lines in the dough sheet engaged by said ribs.

8. A ravioli machine comprising a table; an endless driven carrier belt having a top lap movable along said table; a first dough feeding assembly positioned to spread a flat sheet of dough on said carrier belt; filler supply means positioned to spread a flat sheet of filler on the sheet of dough on said belt; a second dough feeding assembly positioned to spread an upper flat sheet of dough over the layer of filler on said first mentioned dough sheet; a driven die roller positioned adjacent a discharge end of said carrier belt adapted to receive the two dough sheets with filler between them when they pass off of said carrier belt; a rotatively mounted driven die cylinder positioned above and close to and in cooperative relation to said die roller; two outwardly protruding edge-sealing annular ribs rigid with the respective end portions of said die cylinder adapted to roll on and seal the marginal portions of the dough sheets as said sheets pass between the die cylinder and the die roller; two peripherally sharpened edge trimmer discs of slightly larger diameter than said edge sealing ribs positioned against and rigid with the respective end portions of said die cylinder adapted to edge-trim dough sheets as said sheets pass between the die cylinder and the die roller; a plurality of spaced apart intersecting annular and transverse ribs on the periphery of said die cylinder of the same height as said edge sealing ribs, all of said ribs cooperating to provide pockets of approximately square outline in the periphery of said die cylinder; and annular and transverse dough-marking members of shallow depth rigid with and protruding from the respective annular and transverse ribs, said dough-marking members being adapted to form dough-weakening indentations along predetermined lines in the dough sheets engaged by said ribs.

9. The apparatus as claimed in claim 8 in which the die cylinder is formed of a plurality of side by side disc shaped body members each having outwardly protruding marginal and transverse ribs forming pockets in the periphery of the body member, and in which the annular dough-marking members are thin discs of slightly larger diameter than the annular ribs on the body members rigidly secured between said body members, and in which the transverse marking members are thin blade like strips imbedded in and rigid with and protruding from the transverse ribs.

10. A ravioli machine comprising a table; an endless driven carrier belt having a top lap supported on and movable along said table; a first dough feeding assembly comprising a dough trough, an endless driven dough feeding belt operating in said dough trough, and a plurality of vertically spaced apart pairs of dough feeding rolls, the uppermost pair of said rolls being positioned to receive dough from said belt and the lowermost pair of said rolls being positioned to spread a lower flat sheet of dough of substantially uniform width on said carrier belt adjacent the location where said carrier belt is moving onto said table; filler supply means positioned to deliver a layer of filler of less width than said lower dough sheet onto said sheet; a second dough feeding assembly comprising a dough trough, an endless driven dough feeding belt operating in said dough trough, and a plurality of vertically spaced apart pairs of dough feeding rolls, the uppermost pair of said rolls being positioned to receive dough from said belt and the lowermost pair of said rolls being positioned to spread an upper flat sheet of dough of greater width than said layer of filler over said filler, said dough sheets registering with each other and having marginal portions positioned to contact each other outwardly from the filler; said table having therein a transverse opening positioned beyond said second dough feeding assembly and over which said carrier belt passes; a free running roller rotatively supported transversely of and below said carrier belt with its upper peripheral portion extending into said transverse table opening and disposed in supporting relation to said carrier belt; and a die cylinder assembly positioned above said carrier belt and roller parallel with and in opposed relation to said roller and in contacting relation to dough sheets on said carrier belt, said die cylinder assembly having peripheral ribs and flanges adapted to engage with and shape dough sheets moving with said belt past said die cylinder assembly.

11. The apparatus as claimed in claim 2 in which, downwardly considered, the two dough feeding rolls of each successive pair are positioned closer together and in which, downwardly considered, successive pairs of dough feeding rolls are positioned closer together and in which, downwardly considered, each successive pair of dough feeding rolls is driven at a greater peripheral speed then the preceding pair.

12. The apparatus as claimed in claim 2 in which the filler supply means comprises a tubular housing positioned between said first and second dough feeding assemblies close to and above and substantially parallel with the carrier belt; filler supply means connected with said housing; a cap on the end of said housing closest to said second dough feeding assembly, said cap having a horizontal discharge slot extending crosswise of said belt close to said belt; and a driven feed screw in said housing operable in ejecting from said housing onto said lower dough strip a flat sheet of filler which is moving parallel with and in the same direction as and at approximately the same speed as said lower dough strip.

References Cited

UNITED STATES PATENTS

| | | | |
|---|---|---|---|
| 1,674,229 | 6/1928 | Scruggs | 107—7 |
| 2,437,202 | 3/1948 | Marino | 107—1 |
| 2,633,242 | 3/1953 | Rhodes | 107—7 XR |
| 2,672,829 | 3/1954 | Rice | 107—12 |
| 2,774,313 | 12/1956 | Lombi | 107—1 |
| 3,299,837 | 1/1967 | Lind | 107—12 |

WALTER A. SCHEEL, *Primary Examiner.*

A. O. HENDERSON, *Assistant Examiner.*